Figure 1:
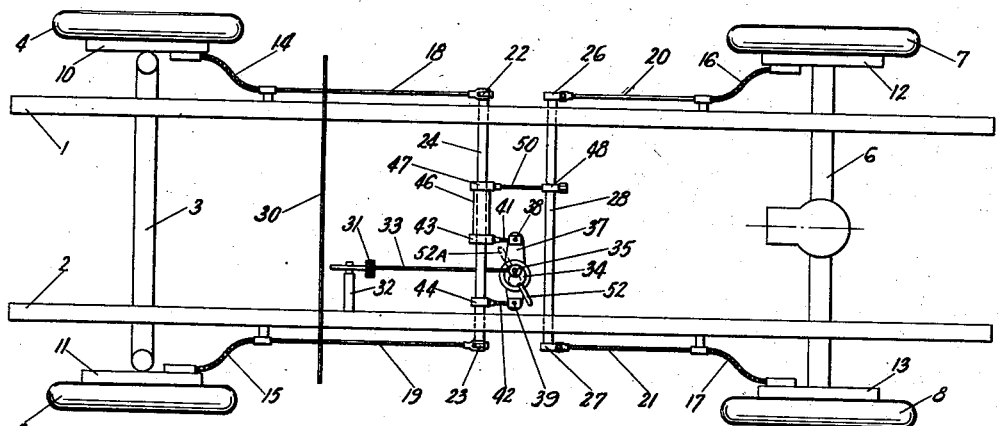

Nov. 28, 1939.　　　A. M. WOLF　　　2,181,161
VEHICLE CONTROL SYSTEM
Filed April 15, 1933　　　6 Sheets-Sheet 1

INVENTOR
BY Austin M. Wolf
ATTORNEY

Nov. 28, 1939.　　　　　A. M. WOLF　　　　　2,181,161
VEHICLE CONTROL SYSTEM
Filed April 15, 1933　　　　　6 Sheets-Sheet 2

INVENTOR
BY Austin M. Wolf
ATTORNEY

Nov. 28, 1939.                A. M. WOLF                 2,181,161
                        VEHICLE CONTROL SYSTEM
                        Filed April 15, 1933          6 Sheets-Sheet 3

INVENTOR
Austin M. Wolf
BY
ATTORNEY

Nov. 28, 1939.　　　　A. M. WOLF　　　　2,181,161
VEHICLE CONTROL SYSTEM
Filed April 15, 1933　　　　6 Sheets-Sheet 4

INVENTOR
BY　Austin M. Wolf
ATTORNEY

Nov. 28, 1939.  A. M. WOLF  2,181,161

VEHICLE CONTROL SYSTEM

Filed April 15, 1933  6 Sheets—Sheet 5

INVENTOR
BY Austin M. Wolf
ATTORNEY

Nov. 28, 1939.        A. M. WOLF        2,181,161
VEHICLE CONTROL SYSTEM
Filed April 15, 1933        6 Sheets-Sheet 6

INVENTOR
BY Austin M. Wolf
ATTORNEY

Patented Nov. 28, 1939

2,181,161

UNITED STATES PATENT OFFICE 2,181,161

VEHICLE CONTROL SYSTEM

Austin M. Wolf, Plainfield, N. J.

Application April 15, 1933, Serial No. 666,332

34 Claims. (Cl. 188—10)

This invention relates particularly to the braking mechanism of a vehicle in which the braking effort is derived through a plurality of axles or pairs of wheel. The object of the invention is to provide a more efficient distribution of the braking effort between the various axles or pairs of wheels. This also results in greater safety of operation.

This is arrived at primarily by the ability to vary the ratio of the braking effort between the axles of pairs of wheels. This variation can be manually or automatically obtained. In the latter case the variation in distribution can be made sensitive to such factors as vary with the rate of positive or negative acceleration, the speed of the vehicle, the static loading thereof or whether the engine of the vehicle aids in the retardation thereof. Some of these factors can be combined. Also road grade conditions will react.

When four-wheel brakes were applied to motor vehicles, an equal distribution of braking effort, from the brake pedal for instance, was distributed between the front and rear brakes. It soon became recognized that due to the increasing of the weight on the front wheels during negative acceleration, that a greater effort should be applied to the front brakes in order to benefit by the change over the static load distribution. Thus we find a distribution of sixty percent of the braking effort on the front wheels and forty percent on the rear. This was a decided improvement over equal distribution and as speeds increase it is natural that greater braking effort will be applied to the forward wheels.

In order to maintain its proper place in the transportation field, automobile speeds must increase and when super-highways become a reality, car speeds of 100 to 120 M. P. H. will be prevalent. Under such conditions a constant distribution of braking effort between the front and rear wheels will not give a satisfactory performance over the entire range of operating conditions. Were the effort on the front wheel brakes increased to cope with the maximum speed conditions, the rear brakes would be of little benefit at reduced speeds. Were the effort on the latter increased, a compromised condition would be obtained whereby the maximum efficiency of the front wheel brakes, as well as the rear, could not be obtained. For this reason it is necessary that the distribution of effort between the front and rear wheel brakes be varied and it is naturally desirable to make this variation automatic in order to relieve the driver of any added efforts in the control of the car. Thus it becomes desirable that the mechanism be automatic and sensitive to the proper conditions that will cause the correctly varying distributions of braking effort between the front and rear wheels in accordance with variations in acceleration or speed, or other phases or conditions.

A further object of the invention is to modify the suspension mechanism so that it will cope with the extreme brake reactions that will be encountered at high speeds and the requirements of rapid negative acceleration. I provide means to stiffen the springs that are subjected to high braking torque reaction because the severity at high speeds would be such as to provide an undue loading on the springs and which can only be circumvented by an auxiliary, outside control. Were the springs to be made stiff enough to cope with the maximum braking reaction, they would be too stiff to afford riding comfort where no reaction comes upon them. This same type of control to cope with negative acceleration can also be used to take care of spring compression during positive acceleration as a result of the application of a high driving torque.

Figure 2:
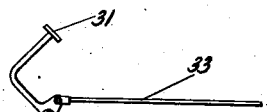
Figure 3:
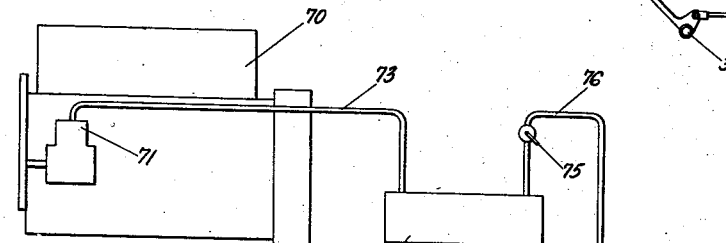
Figure 4:
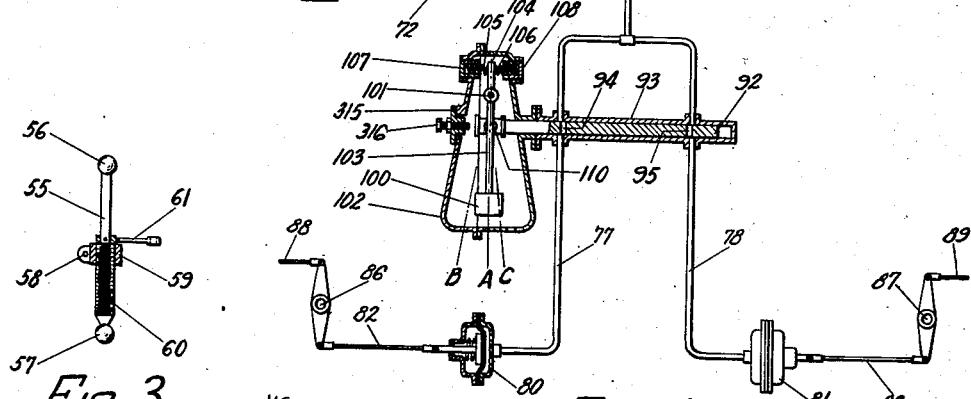
Figure 5:
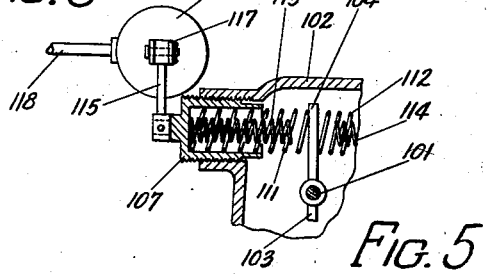
Figure 6:
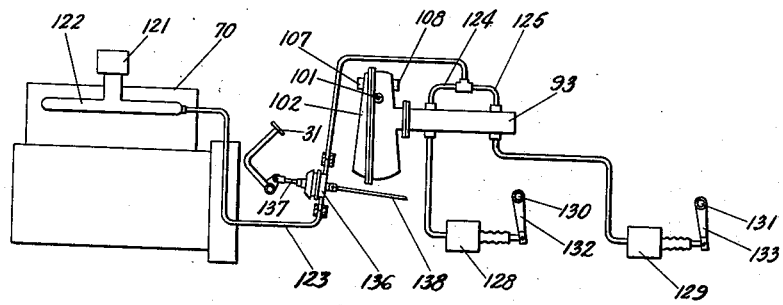
Figure 7:
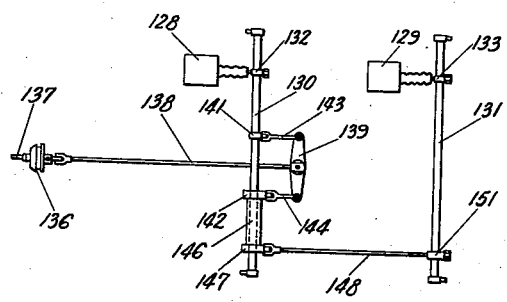
Figure 8:
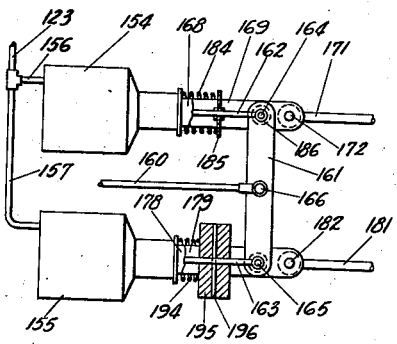
Figure 9:
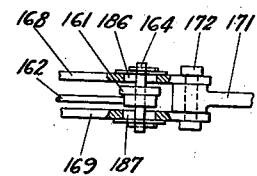
Figure 11:
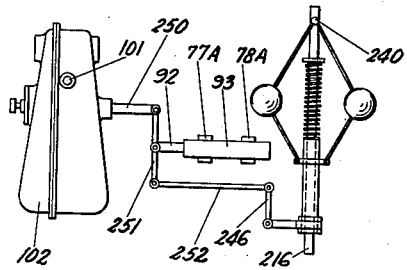
Figure 10:
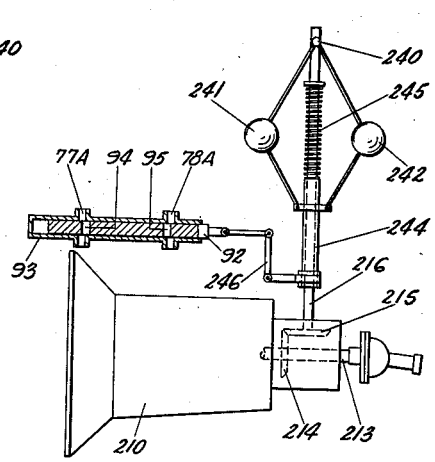
Figure 12:
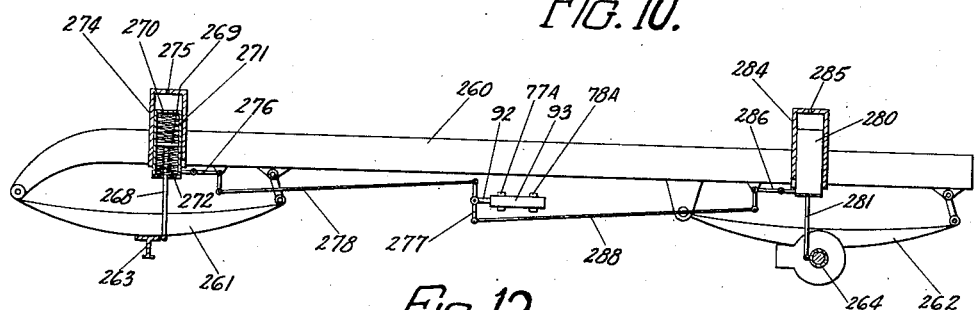
Figure 13:
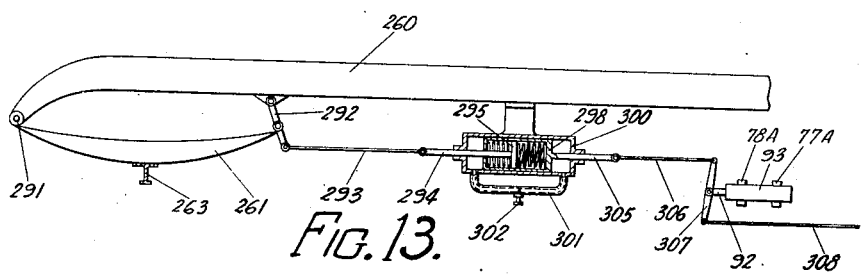
Figure 14:
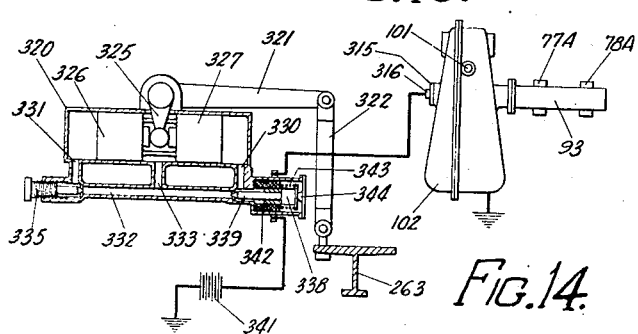
Figure 15:
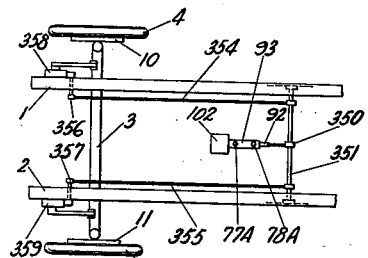
Figure 16:
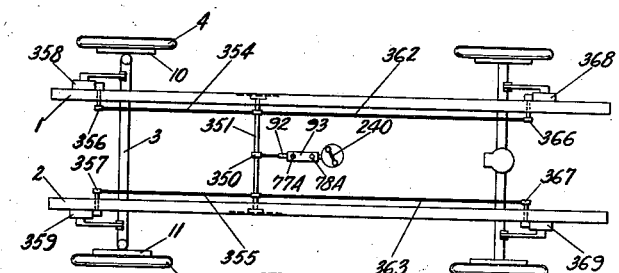
Figure 17:
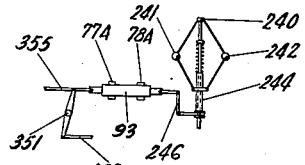
Figure 18:
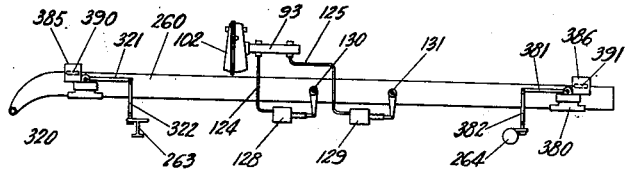
Figure 19:
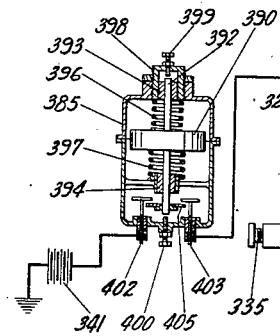
Figure 20:
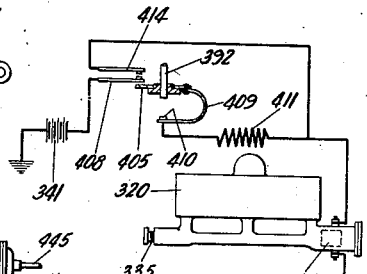
Figure 21:
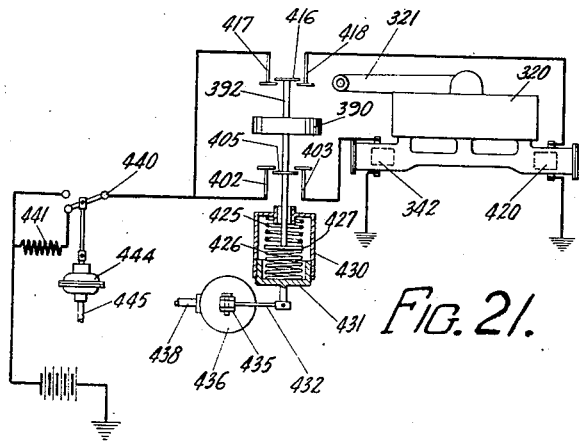
Figure 22:
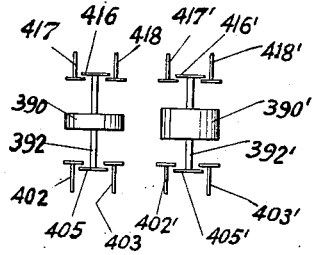
Figure 23:
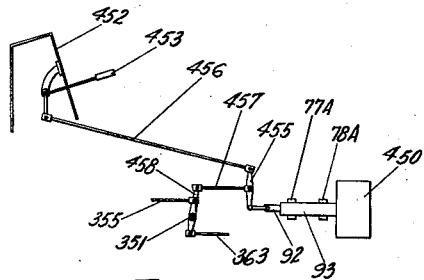
Figure 24:
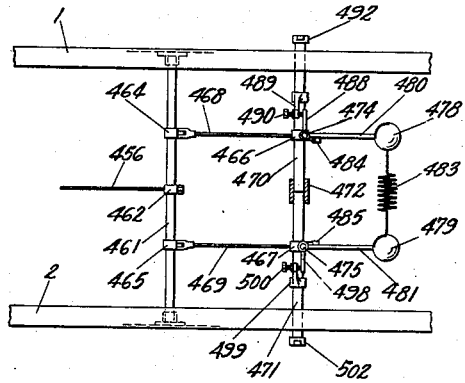
Figure 25:
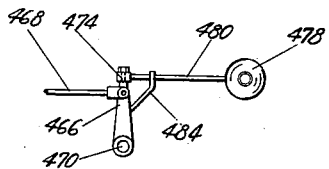
Figure 27:
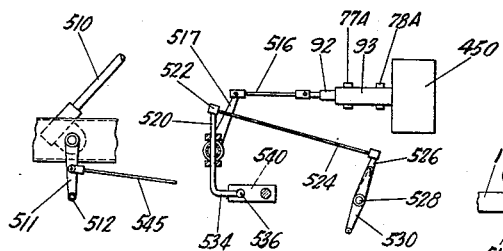
Figure 26:
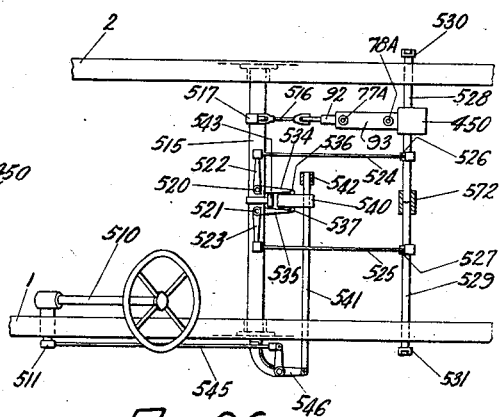

These and other objects will be clarified by resorting to the accompanying drawings in which, Fig. 1 is a plan view of a chassis, showing manual means to vary the braking distribution fore-and-aft, Fig. 2 shows the pedal-brake rod of Fig. 1 in elevation, Fig. 3 shows a modified form of equalizer bar, Fig. 4 shows an automatic, inertia control mechanism utilizing compressed air as the braking medium, Fig. 5 shows a two-stage spring unit in place of the single spring in Fig. 4, Figs. 6 and 7 show the automatic distribution applied to a vacuum booster system, Figs. 8 and 9 show a modified form of booster cylinder and valve control, Fig. 10 shows an automatic mechanism sensitive to speed variations of the vehicle, Fig. 11 shows a combination of inertia and speed responsive controls, Figs. 12 and 13 show a means of varying the braking distribution dependent upon the static loading at each end of the vehicle, Fig. 14 shows an electrical control, actuated by an inertia mechanism, to increase the resistance of the suspension system when subjected to high braking torque, Fig. 15 shows a mechanical inter-connection of these same elements, neutralizing inertia control, Figs. 16 and 17 show the relationship with a control mechanism sensitive to speed variation, Figs. 18 and 19 show a shock absorber control which is used in conjunction with my improved braking system in order to cope with high braking torque reactions, Figs. 20, 21 and 22 show modified forms of shock absorber control mechanisms, Fig. 23 shows the inter-connection of a ride-control shock absorber linkage with the automatic braking distribution system, Figs. 24 and 25 show a shock absorber control that is sensitive to transverse inertia, such as centrifugal force, and which stiffens the shock absorbers on the desirable side of the vehicle, Figs. 26 and 27 show the inter-connection of a shock absorber control based on the automatic break distributing mechanism and the steering apparatus of the vehicle.

Figure 30:
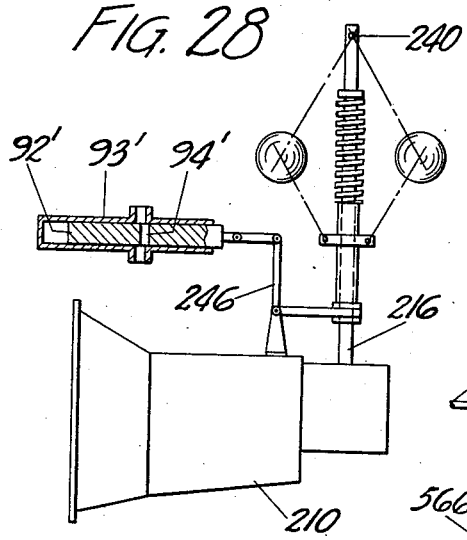
Figure 31:
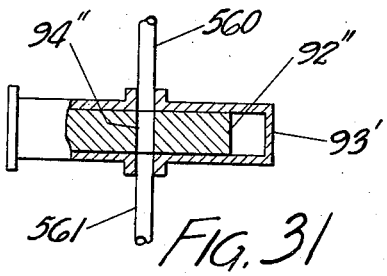
Figure 32:
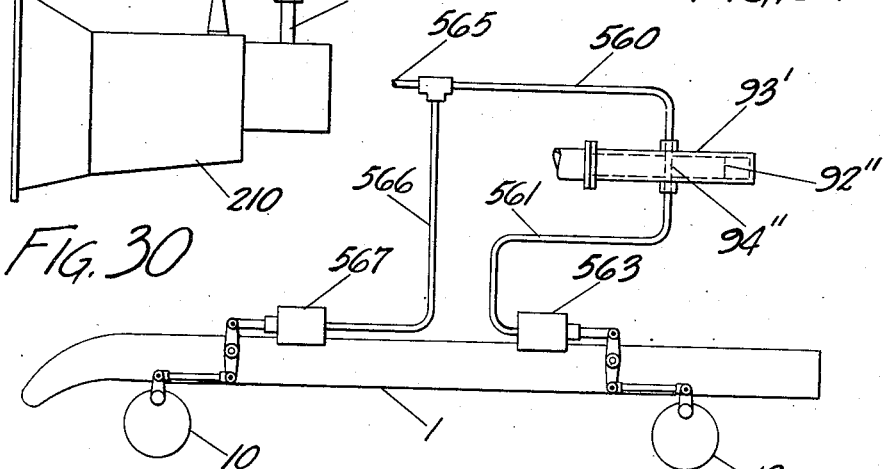

Figs. 28, 29, 30 and 31 show the adaptation of a portion of my control mechanism, Fig. 32 shows an application thereof.

Referring to Fig 1, a motor vehicle is depicted having the side rails 1 and 2, a front axle 3 with wheels 4 and 5 at the extremities thereof and a rear axle 6 with the wheels 7 and 8. The brake drums 10, 11, 12 and 13 are secured to the wheels 4, 5, 7 and 8 respectively. The braking mechanism within the drums (not shown) is actuated by the flexible connections 14, 15, 16 and 17. These connections can be for a fluid or mechanical braking system as in common practice. The particular application shown is of the mechanical type in which the brake rods 18, 19, 20 and 21 actuate a flexible cable within the conduits 14, 15, 16 and 17 at the wheel ends thereof and attach near the center of the vehicle to the upturned levers 22 and 23 of the front brake cross shaft 24 and the downwardly projecting levers 26 and 27 of the rear brake cross shaft 28. Assuming the vehicle to be of conventional construction, there is placed to the rear of the dash 30 a brake pedal 31 which is supported by a bracket 32 on the side rail 2. A brake rod 33 is attached to pedal 31 as indicated in Fig. 2 so that depression of pedal 31 causes a forward movement of rod 33. The rear end of rod 33 is anchored eccentrically in the trunnion 34, the latter being mounted in the off-center boss of the equalizer bar 37. In the position shown the anchor pin 35 at the rear end of rod 33 is located midway between the ends 38 and 39 of the equalizer bar. The links 41 and 42 extend from the ends 38 and 39 of equalizer bar 37 to levers 43 and 44. The latter is fixed to the front cross shaft 24 while the former floats thereupon and through the intermediary of the sleeve 46 and lever 47, conveys motion to the lever 48 on the cross shaft 28 by means of link 50.

With the parts in the relationship shown by the full lines, the effort exerted on pedal 31 is conveyed to equalizer bar 37 and distributed equally to the front and rear cross shafts 24 and 28. A lever 52 is attached to trunnion 34 and if swung around to the dotted position 52—a, the pin 35 will not be centrally located within the ends 38 and 39 but will be closer to the end 39, thereby distributing a greater braking effort to the front cross shaft 24. The actual dimensional change thus effected will be dependent upon the desirable change in distribution of braking effort between the two shafts 24 and 28. While the trunnion 34 is shown with a manual means of shifting the rear end of rod 33, it is easily conceivable that this operation can be done by remote control if so desired. The lever 52 can be hinged to trunnion 34 in such a manner that it drops into a notch (not shown) in the hub rim of the equalizer bar 37 in order to lock it in either of the positions shown.

In order to provide an equalizer bar in which the variation can be in small increments, the equalizer bar 55 shown in Fig. 3 is provided with the ends 56 and 57. The rear end of brake rod 33 in Fig. 1 would be affixed to the tongue 58 on the threaded sleeve 59 and in the position shown lies midway between the ends 56 and 57. It is located on the threaded portion 60 of the equalizer bar. A lever 61 is pinned to the equalizer bar 55 in order that it might effect rotation thereof at will. Such rotation will allow the shifting of the sleeve 59 from the mid-position shown to one in close proximity to the end 57. Due to the ball-shaped formation of ends 56 and 57, such rotation of the whole bar is possible. The lever 61 can be actuated by direct manual manipulation or a form of remote control.

While Fig. 1 shows a four-wheel vehicle, it is understood that a six or eight wheel vehicle would not affect the mechanism which proportions the braking effort fore-and-aft. Should two rear axles be used, a brake cross shaft 28 would provide the initial pull on the braking mechanism extending rearward. Brake shaft 24 would likewise accomplish the same for a multiple front axle construction. Neither would the use of independent wheel suspension affect the invention. Whereas a motor vehicle is shown, it is apparent that a system of varying the braking effort of each end thereof is also applicable to vehicles that run on rails as well as the road.

In Fig. 4 the prime mover 70 is provided with the air compressor 71. Compressed air is conducted to the storage tank 72 through the pipe 73. The control valve 75, foot or hand operated, is located in the line 76, which latter branches into the two lines 77 and 78, conveying air from the reservoir 72 to the brake cylinders or diaphragm units 80 and 81. By means of the links 82 and 83 the brake cross shafts 86 and 87 are actuated, together with the brake rods 88 and 89, when air enters the cylinders 80 and 81. In place of the cross shaft construction, the cylinders 80 and 81 can be located on the vehicle axle, singly or in pairs, with the customary flexible connection between the frame and the axles.

Up to this point, the air brake actuation follows current practice. However, a control mechanism is interposed in the branches 77 and 78 whereby the intensity of the braking action is increased on one brake cylinder and decreased on the other. This control is accomplished by means of the slide 92 within the housing 93. It will be noted that slide 92 is provided with apertures 94 and 95. Instead of being in line with the tubes 77 and 78, or their port openings in casing 93, they are in staggered relationship. In the layout shown, they are closer together than the branches 77 and 78 but afford an equal opening area to each of said branches. If valve 75 is opened, compressed air will be equally distributed to cylinders 80 and 81. This equal distribution is permissible when the vehicle is traveling at low speed. To provide an automatic control, I utilize a weighted member or pendulum 100 which is pivoted on shaft 101 within the casing 102 through the intermediary of shank 103. The upwardly extending shank 104 is centered by means of the spring 105 and 106. The latter are mounted within the cups 107 and 108 which are threaded on their outside and mounted within bosses in the casing 102. If we now assume that the vehicle is traveling at speed and that the brakes are applied, equal air distribution will be initiated. Immediately upon the retarding influence of the brakes, the pendulum 100 will leave its mid-position, indicated by center line A and assume a position indicated, for instance, by center line B. The movement of pendulum 100 is conveyed by means of the engaging sleeve member 110 to the slide 92. This movement places port 94 in increasing alignment with branch 77 and causes an increasing misalignment or cut-off of port 95 with branch 78. Due to the variation of effective areas between ports 94 and 95 and branches 77 and 78, a greater amount of compressed air will reach brake cylinder 80. It will be understood that slide 92 will move immediately when negative acceleration occurs due to the inertia of pendulum 100 and the extent of the movement will be controlled by means of spring 106. As the brakes are applied, pendulum 100 will progressively move forward until it reaches a stable position depending upon the extent of the negative acceleration. As the vehicle slows up, the pendulum will swing back toward its normal position and will finally assume the mid-position A at very low speed and at rest. This construction, while not immediately responsive to the initial opening of valve 75, will quickly initiate the distribution phase as soon as the deceleration occurs and can be made sufficiently responsive by means of the control spring 106. The shape of ports 94 and 95 can be made circular, rectangular, triangular, or of any desirable form in order to provide the desirable area increase or cut-off.

From reference to Fig. 4 it will be seen that when valve 75 is opened, the high velocity pressure fluid emerging from ports 94 and 95 tends to create a vacuum at the lower face of member 92 so that there is no pressure thereon, while the greater part of the fluid columns exert a direct pressure upon the upper face of said member, thus stabilizing the latter in its normal position. Long before an equalizing pressure can build up in pipe lines 77 and 78 the brakes are applied and deceleration takes place, whereupon the inertia device actuates member 92.

By making the springs 105 and 106 sufficiently flexible, the apparatus can be made sensitive to vehicle inclination, such as ascending or descending a grade or hill. Assuming that the vehicle is climbing a mountain road, the pendulum 100 would assume a position C, resulting in a rearward (to the right) movement of the slide 92 whereby the brake cylinder 81 would be fed an increased amount of air upon the actuation of valve 75. It will thus be realized that the inertia mechanism shown is sensitive to grade inclination as well as inertia due to acceleration. Should a vehicle move backwards at an excessive rate, pendulum 100 would swing to position C, resulting in greater effort on the cross shaft 87. Such a contingency would be desirable on a bus or truck.

In order to insure greater sensitivity over the single springs shown in Fig. 4, a dual spring construction can be used as indicated in Fig. 5. Light, outer, flexible springs 111 and 112 centralize the shank 104. Within these springs are the smaller, more rigid springs 113 and 114 which come into contact with shank 104 after the initial compression of either spring 111 or 112. A two-stage progression is thereby furnished. Fig. 5 shows the same type of threaded cup 107, while the corresponding cup 108 (not shown) is located on the other side of shank 104. Should it be desirable to alter the sensitivity of the springs to differentiate between normal traveling when varying grades, positive and negative, are encountered and between periods of braking action, the lever 115 can be secured to cup 107 and a corresponding lever to cup 108. Assuming that the more sensitive position exists, as disclosed in Fig. 5, for normal traveling, rotation of the threaded cups 107 and 108 will cause stiffening of the springs and make them available under the stiffer condition for braking distribution control. This can be accomplished by placing a diaphragm chamber 116 in line with lever 115 and actuating the latter through the clevis 117. A similar diaphragm chamber, clevis and lever are used for cup 108. The tube 118, conveying air to the rear of the diaphragm chamber, is connected with line 76 in Fig. 4 so that the establishment of pressure in the line will actuate the lever 115 by means of the diaphragm chamber 116.

The direction of lead and the pitch of the threads on cups 107 and 108 are such as to provide a necessary movement of the cups to obtain the desired increased spring stiffness during the braking period.

In Fig. 6 which shows the application of my invention to a vacuum braking system, the prime mover 70 is provided with the down-draft carburetor 121 which is connected with the intake manifold 122. The vacuum line 123 is divided into the two branches 124 and 125 and vacuum is conveyed to the booster brake cylinders 128 and 129. The latter actuate the front and rear brake cross shafts 130 and 131 respectively through the levers 132 and 133. Interposed in the vacuum line 123 is the automatic control valve 136. As is the usual practice in this type of apparatus, the valve 136 is located between, and forms a connecting member with, the brake rods 137 and 138 which lead to the equalizer bar 139, shown in Fig. 7. The latter divides the foot pressure exerted on pedal 31 between levers 141 and 142 through the intermediary of links 143 and 144. Lever 141 is keyed to the forward cross shaft 130 and lever 142 together with sleeve 146 and lever 147 float upon shaft 130. A rod 148 extends between lever 147 and lever 151 which is secured to the rear brake cross shaft 131. This construction, in the absence of a vacuum in the braking system, allows the foot pressure to be exerted equally upon the cross shafts 130 and 131. This is a safety provision in the event that an engine should stall or become inoperative when it is necessary to apply the brakes. However, this condition exists but rarely and in referring to Fig. 6 it will be noted that interposed in the vacuum branches 124 and 125, there is located an inertia control mechanism similar to that disclosed in Fig. 4. It consists of the casing 93 with a like side 92 (not shown) contained therein and the pendulum casing 102. The operation is identical, excepting that a vacuum is dealt with instead of compressed air. Pendulum inertia becomes operative in a like manner to that explained in conjunction with Fig. 4 and the pendulum is also sensitive to the force of gravity. When a brake application is made, the pendulum moves forward and the port opening of the slide in branch 124 assumes an increasing area while the port area in line with branch 125 diminishes. In this way booster cylinder 128 will exert a greater force than cylinder 129, the increase depending upon the relationship of the ports which again is dependent upon the position assumed by the pendulum under the influence of inertia. In place of the ports provided by slide 92, it is possible to substitute the conventional type of diaphragm or disc vacuum regulating valve. However, the principle of operation in either case is identical, the only difference being in the relative initial port areas.

In Figs. 8 and 9, the reactionary type of booster brake cylinder is indicated. The actual valve in the center of the cylinder is not shown since the construction and operation are known to those versed in the art. The booster cylinders 154 and 155 connect with the vacuum line 123 that extends to the intake manifold through the branches 156 and 157. The brake rod 160 connects with the conventional brake pedal and actuates the equalizer bar 161. It actuates the valve control rods 162 and 163 by means of pins 164 and 165 located equally distant from the center clevis pin 166. The piston in the cylinder 154 is connected with top and bottom bars 168 and 169 and the latter extend rearwardly to encompass the rod end of brake rod 171 and convey motion thereto by means of pin 172. A similar top and bottom bar 178 and 179 are actuated by the piston within cylinder 155 and extend rearwardly to take brake rod 181 by means of pin 182. The pins 164 and 165 fit in clearance holes in the bars 168, 169, 178 and 179. The clearance holes allow movement of the valve rods 162 and 163 upon the initial movement of equalizer 161. This in turn allows the entrance of air into the rear end of cylinders 154 and 155 which causes bars 168, 169, 178 and 179 to move forward and transmit their braking pull to the brake rods 171 and 181. The former is connected with the rear brake cross shaft and the latter with the front brake cross shaft. The spring 184 presses against the disc 185 on valve rod 162 and maintains it in the normal valve position, corresponding to the pin 164 being located at the rear portion of the clearance hole 186 in bar 168. A similar clearance hole 187 exists in the lower bar 169. The clearance hole allows the brake cylinder piston to catch up with the corresponding foot position on the pedal and to increase the pull on the brake rods, or to hold them according to whether the foot is further advanced or held in the same position on the brake pedal. The spring 194 holds valve rod 163 in the normal or released position by pressing against the mass 195 which is secured to rod 163 by the pin 196. The mass 195 is acted upon by spring 194 in a similar manner to the pressure on disc 185 by spring 184. The mass 195 slides freely on bars 178 and 179, except insofar as it is restrained by spring 194. Under the influence of inertia, such as when the vehicle is braking, the mass 195 will slide forward and advance the valve control rod 163 over rod 162. This is possible due to the clearance hole construction around pin 165. Since booster cylinder 155 will exert a greater braking effort due to the inertia influence, the brake rod 181 is connected with the front brake cross shaft.

Another method of providing a varying proportioning effort between the front and rear brakes, is to make the slide 92 sensitive to speed variation. This can be accomplished, as shown in Fig. 10, by providing a centrifugal unit 240 at the rear of the transmission 210, being driven from the universal joint shaft 213 by means of bevel gears 214 and 215. Since shaft 213 is always moving at a speed in proportion to the vehicle speed, slide 92 will be sensitive to speed variation of the vehicle. As the speed increases the masses 241 and 242 will fly outwardly and raise sleeve 244 against the pressure of spring 245. The rise of sleeve 244 will actuate bell crank 246 which in turn will move slide 92 forward or to the left. The ports 94 and 95 bear the same relationship to the casing ports 77—a and 78—a as in Fig. 4. The action will be similar, regardless of what fluid-braking medium be used. While compressed air and vacuum have been previously mentioned, it will be seen that this invention is equally applicable to a hydraulic system. With the use of a centrifugal governor 240, the slide 92 will always be in a position corresponding to the vehicle speed and the total areas and spacing can be laid out for any pre-determined desirable proportioning of braking effort. In this construction the ports are always in an active position whereas in the construction utilizing inertia, there is a very slight anticipatory dwell.

In Fig. 11 a combination of inertia and speed sensitive members is utilized. The centrifugal governor 240 is driven by the shaft 216 and actuates bell crank 246 as heretofore. The inertia element casing 102 contains a pendulum which actuates member 250 which is connected with the equalizer bar 251. A link 252 extends between bell crank 246 and equalizer 251. Increase of vehicle speed or of inertia when braking in a forward-running position, will move slide 92 to the left or forward. Variation in either phase is automatically compensated for by the equalizer 251.

In commercial vehicles and buses, a wide latitude exists in possible loading conditions, particularly when the vehicle is not fully loaded. It is therefore very difficult to pre-determine a definite braking proportioning between the front and rear braking units. In Fig. 12 means are provided whereby the static loading of each end of the vehicle becomes effective in proportioning the desired braking effort. Increase in the weight on either end will increase the braking ratio on that end. The chassis frame 260 is provided with front and rear springs 261 and 262 respectively and which are fastened to the front and rear axles 263 and 264. A link 268 extends upwardly from front axle 263 and has a head 269. This head is centrally disposed within a double ended cylinder 270. Light, flexible springs 271 and 272 are located between the head 269 and the top and bottom heads of cylinder 270. The latter is mounted in sliding relationship within cylinder 274 on the chassis frame 260. It is provided with a small aperture 275 in order to provide a dash-pot effect when cylinder 270 attempts to rise and fall therein under the influence of axle movement. The resiliency of springs 271 and 272 and the dash-pot insure slight movement of cylinder 270 when the vehicle is traveling over the road. Movement of cylinder 270 is conveyed to the bell crank 276 which in turn actuates the equalizer bar 277 by means of the connecting rod 278. The rear axle is connected to cylinder 280 by means of the link 281 and the head thereof and the interposed springs simulate the construction shown at the forward end of the chassis. Cylinder 280 is mounted in cylinder 284 on the chassis frame which has a cylinder vent 285. Cylinder 280 actuates bell crank 286 and is connected to the equalizer bar 277 by means of rod 288. It will be seen that when load is added to the front end of the chassis, the deflection of spring 261 will allow cylinder 274 to more closely approach the axle or if the chassis frame 260 be considered stationary, axle 263 can be pictured as approaching it. This movement will impart a clockwise rotation to bell crank 276 which in turn will move slide 92 to the left and thus make the brake proportioning mechanism exert a greater braking effort on the front wheels. Greater loading of the rear end of the chassis will cause a counter-clockwise rotation of bell crank 286 which will cause slide 92 to move to the right and increase the braking effort on the rear wheels. The casing 93 is shown in Fig. 12 but the fluid brake connections thereto are not shown since they are similar to the layouts of either Fig. 4 or 6. In this way braking effort is increased on that end of the vehicle which has increased its load. Should both ends be loaded similarly, the equalizer bar 277 will allow slide 92 to retain its position without shifting.

In Fig. 13 the chassis 260 is shown with the front spring 261 on axle 263. The spring is fixed to the horn by means of the front mounting 291 and the shackle 292. As the load increases the compression of the spring and its longitudinal extension will cause the lower end of shackle 292 to move to the right and impart this movement to rod 293. The rod 294, connected therewith, is provided with a head 295. There is a spring on each side of same within the cylinder 298. The latter is contained within cylinder 300 mounted on chassis frame 260. An air or hydraulic dashpot effect is obtained by connecting each end of cylinder 300 with the connecting tube 301 in which lies a metering point at the end of adjusting screw 302. Vibratory movement due to road shock and inequalities, is damped out thereby. Cylinder 298 projects through the back end of cylinder 300 by means of the stem 305. Link 306 is connected with equalizer bar 307. A similar mechanism (not shown) is located at the head of the rear spring and actuated thereby. The movement from this rear unit is communicated to equalizer bar 307 through rod 308. The center of the equalizer bar is connected to slide 92. The actuation of equalizer bar 307 and the slide 92 corresponds to a similar action of the construction shown in Fig. 12. Whereas in the said construction, rod 278 moves forward upon the compression of the spring and whereas rod 293 moves rearwardly under the compression of spring 261, this difference is taken care of by transposing ports 77—a and 78—a in casing 93 in the opposite relationship to that indicated in previous figures.

Referring to Figs. 4 and 14, it will be noted that the pendulum case 102 is provided with the insulation block 315. Passing through same is the adjusting screw 316. The screw has a dual function of acting as a limiting stop and also as an electrical contact point. In Fig. 14 the shock absorber 320 is provided with the arm 321, the latter being connected with axle 263 by means of link 322. The lever arm 325 is actuated by arm 321 and operates the double piston member 326—327. The two pistons are interconnected with struts, and can be provided with the customary relief valves (not shown). The space at each end of the shock absorber cylinder 320 is provided with a passageway 330 and 331 which communicate with the connecting passageway 332. The entire space is filled with shock absorber fluid, as well as the space between pistons 326 and 327 and the central connecting passageway 333. In this form of construction each piston is restricted to a single function. When the arm 321 is raised due to spring compression, the piston unit moves to the right and piston 327 circulates the fluid through passageways 330, 332 and 333 and thus takes care of the compression action of the spring. Movement of the piston unit due to spring rebound, whereby arm 321 moves downward and the piston unit to the left, results in the fluid in the left end of cylinder 320 being transferred through passageways 331, 332 and 333 to the space between pistons 326 and 327. Piston 326 therefore takes care of the rebound action. The permissible rate of flow of the shock absorber fluid is controlled by the adjusting screw 335.

When cars shall be operated at the future high speeds that are inevitable, the braking action will cause a severe reaction on the suspension system and will result in a sudden and severe compression of the spring. It is well appreciated how present day vehicles "nose down" their front ends upon a severe brake application. In order to prevent excessive spring compression due to the brake torque reaction, I propose to stiffen up the suspension system momentarily during severe braking. An electrical method of accomplishing this is provided by affixing the core 338 to the needle valve 339. In the position shown the needle valve 339 is set so as to provide a normal restriction to fluid acting in the compression end of the shock absorber cylinder. Under severe braking, pendulum 100 will swing forward and cause the front end of thimble 110 to contact with screw 316. Current will then flow from battery 341 through solenoid 342, to contact screw 316 and ground itself through case 102 when the pendulum is in a forward, extreme position. Solenoid 342 will move core 338, and with it needle valve 339, to the left against the pressure of spring 343, thereby offering a greater resistance to flow of the shock absorber fluid in the compression end of the system. Spring 343 normally holds core 338 against the stop on the inside of the end cap 344. The height of the stop naturally determines the normal restriction of the needle valve 339 and if desired can be replaced by a set screw.

A mechanical method of accomplishing what has just been described in reference to Fig. 14, is indicated in Fig. 15 in which the slide 92 is extended to the rear from casing 93 and actuates a lever 350 on cross shaft 351. Levers at each end of this shaft actuate rods 354 and 355 which are connected with levers 356 and 357, the latter being located on control shafts of the shock absorbers 358 and 359. The levers 356 and 357 control ports in the shock absorbers similar to the ride-control ports of present day shock absorbers, an example of which is disclosed in the patent to Seaholm No. 2,023,034, December 3, 1935. In this construction the shock absorber control will be in proportion to the movement of slide 92 and the more severe the braking, the greater resisting action of the shock absorbers will ensue and restrain the otherwise downward movement of the chassis frame. At the same time the slide 92 controls the proportioning of braking effort between the front and rear axles.

In Figs. 16 and 17 the centrifugal unit 240 is shown and actuates the slide 92 which is connected to cross shaft 351. The forward shock absorber control is similar to that shown in Fig. 15, but in addition the rods 362 and 363 actuate levers 366 and 367 on shock absorbers 368 and 369. The centrifugal unit 240 actuates the slide 92 for the proper brake proportioning and in addition thereto varies the resistance of the shock absorbers according to the speed of the vehicle. Due to the fact that impact forces increase with the square of the speed, this automatic control will increase the resistance of the shock absorbers so that they can better cope with the varying intensities of impact with variation in vehicle speed. Naturally the port openings in the shock absorbers can be so designed as to give the desirable increase in resistance as the control levers are actuated.

The shock absorber control described in Figs. 14 and 15 depends upon the sensitiveness of the pendulum 100 and provides a direct actuation of the shock absorber control with variation in the longitudinal inertia of the vehicle when in motion. Should it be desirable to separate the various members of such a mechanism, it is possible to isolate the shock absorber control from the brake proportioning members. Since we are interested in counteracting any abnormal change in the position of the chassis frame such as when "nosing down", equally good results can be obtained by providing a sensitive shock absorber control. This can be done by the adaptation of the contact type of acclerometer. Fig. 18 shows the general disposition of the various units and Fig. 19 is a detail of the shock absorber control. In Fig. 18, the front shock absorber 320 is connected with axle 263 in the customary manner. Rear axle 264 is connected to shock absorber 380 whose arm 381 is connected with link 382. Forming a unit with, or separate from, shock absorbers 320 and 380 are the control units 385 and 386. A detailed description of the front shock absorber control will be given by referring to Fig. 19. Within the casing 385 is located the mass 390. It is mounted on a central stem 392 and guided top and bottom in the graphite bushings 393 and 394. The mass 390 is held in a floating position by means of springs 396 and 397. The proper, final setting of the springs is obtained by an adjustable end cap 398. Set screws 399 and 400 limit the vertical travel of mass 390 in order to prevent unnecessary working of the springs and to prevent the latter from interfering with inertia effects. The battery 341 is connected with screw 402 which has a circular head at the top thereof. A similar screw 403 is disposed on the opposite side of housing 385, both screws being insulated therefrom. The disc 405 is mounted on stem 392 and is insulated therefrom. Screws 402 and 403 are adjustable vertically so as to establish the desired gap between the sleeves of screws 402 and 403 and the disc 405. Sudden downward movement of the frame due to brake reaction results in the disc 405 contacting with the heads of screws 402 and 403 when the mass 390 attempts to remain stationary and the housing 385 drops with the frame. With the contact closed, current flows to solenoid 342 and the restriction to flow on the compression side of shock absorber 320 is similar to the explanation in connection with Fig. 14. It will be appreciated that a similar system can also be worked out to take care of sudden engine torque application to prevent the raising of the front end of the frame and the depression of the back end by utilizing such an inertia control in connection with the rear shock absorber 380 in Fig. 18 by means of the mass 391.

Should it be desired to utilize the mass 390 in Fig. 18 to control one side of the shock absorber, for instance the compression side, for ordinary running conditions over the road and to isolate the effects of brake reaction and inertia, the switch 406 may be used as shown to open the circuit from solenoid 342 during periods of braking and thus make solenoid 342 inoperative. This can be accomplished by providing the diaphragm chamber 444, mechanically connected to switch 406, and the pipe 445 leading to the air line of the brake cylinders, such as from pipe 76 in Fig. 4. In the position shown in Fig. 18, the solenoid circuit is completed when disc 405 bridges contacts 402 and 403. When air is applied to the brakes, the pressure in the line is communicated also through pipe 445 to chamber 444 which moves the lower end of switch 406 to the left and opens the circuit.

In order to obtain a closer control of the needle valve actuated by solenoid 342 to provide greater sensitivity to, and response from, brake reaction and "nosing down," a two-stage control is shown in Fig. 20. A greater amplitude is allowed stem 392 and the initial contact occurs when the spring member 408 contacts with disc 405. Current flows from battery 341 through these two members and the flexible cable 409. From its stationary anchorage 410 current flows to solenoid 342 through the resistance 411. A given movement of the needle valve is obtained, depending upon the current intensity and the pressure of the retractor spring 343 in Fig. 14. Greater current intensity will cause a further movement of the needle valve and this is obtained when the continued upward movement of stem 392 deflects spring member 408 so that its end contacts with member 414. The establishment of this contact will short-circuit resistance 411 and allow more current to flow through solenoid 342.

In Fig. 21 the electrical control described in connection with Fig. 19 for control of frame movement due to braking torque reaction, is applied to a conventional shock absorber unit 320, for the customary shock absorber control. It is provided with the usual operating arm 321. The weight 390 on stem 392 is provided as heretofore and the disc 405 at its lower end will contact with the heads of screws 402 and 403, thereby bridging the electrical gap normally maintained, when weight 390 moves upward in relation to screws 402 and 403. A disc 416 is mounted on the top of stem 392 and bridges the gap between the heads of set screws 417 and 418 when the weight 390 moves downward relative to said screws. When the lower gap is bridged by disc 405, the solenoid 342 on the compression end of the shock absorber is energized and the needle valve under its control places greater resistance to the flow of shock absorber fluid from the compression end of the cylinder. When disc 416 bridges the upper gap and solenoid 420 is energized thereby, greater resistance is offered to the flow of shock absorber fluid from the rebound end of the cylinder. When the vehicle strikes an obstruction, the springs are compressed and the frame moves upwardly. The inertia of rest of weight 390 causes it to remain stationary against the action of its supporting spring and disc 416 contacts with the heads of screws 417 and 418. Were one's point of view fixed with the frame, the action of weight 390 would be downward in relation thereto, causing the contact described. Since the springs are in the compressed state and are about to rebound or reverse themselves, the added resistance at the rebound end of the shock absorber retards their motion and snubs the intensity of their rebound. When the chassis springs have straightened out, most of the rebound energy has been snubbed from them and the chassis frame and body begin to drop. This dropping action results in the lower circuit being completed through the relative upward movement of disc 405 and the solenoid 342 at the compression end is energized. In this way resistance is offered the chassis springs on their next cycle of compression. In this way alternate resistance is offered so that each phase of compression and rebound is anticipated and properly snubbed. It will be noted that the system described will also offer the desired resistance to frame movement during the braking torque reaction. Downward movement of the frame results in a relative upward movement of the weight 390 and the compression end of the shock absorber is made to offer increased resistance.

In order to provide a differentiation in the sensitiveness of the action of weight 390 between the conditions of normal driving and during braking, the springs 425 and 426, located on either side of disc 427 which is affixed to stem 392, are located within the housing 430. A cup member 431 is threaded therein and supports the lower end of spring 426. A lever 432 is attached to the cup 431 and is actuated by the clevis 435 operated by diaphragm chamber 436. The pipe 438 connects with the air supply to the brake cylinders, such as line 76 in Fig. 4. Operation of the brakes actuates diaphragm chamber 436 and causes rotation of cup 431, thereby compressing springs 425 and 426. In this way the sensitivity of weight 390 to movement becomes less during braking operations when the severity of frame movement is greater than during normal riding. Means can be provided (not shown) to maintain disc 427 in a central position during compression of springs 425 and 426, so as not to alter the relation of weight 390 and the end stops 399 and 400 in Fig. 19. A threaded member could be provided at each end of housing 430. Another means of making the mechanism more sensitive to normal riding over braking periods, is to provide the switch 440 in the circuit between battery 341 and the operating circuit. This method is an electrical alternative for the mechanical combination of springs 425 and 426, disc 427, cup 431, lever 432 and the diaphragm chamber 436. In the position shown current passes through the switch by way of resistance 441, thereby cutting down the intensity of the current flow to solenoids 342 and 420. When the brakes are applied the diaphragm chamber 444 raises the switch 440, thereby obviating current flow through resistance 441. In this way the full intensity of the current energizes the solenoids. A pipe 445 is connected with the air delivery line to the brake cylinders. It will be understood that in place of compressed air being used in chambers 436 and 444, that a vacuum chamber can be used in which case the chamber would be on the opposite side of the actuated member.

A multi-stage control can be provided as shown in Fig. 22 by utilizing a plurality of elements such as the weights 390 on stem 392 and weight 390' on stem 392'. The heads of the contact screws 402 and 403 serve the disc 405 at the bottom of stem 392. The heads of screws 402' and 403' serve the disc 405' at the base of stem 392'. Corresponding top screws 417 and 418 serve the disc 416 and screws 417' and 418' serve disc 416'. In this way weights sensitive to different inertia forces can be utilized.

When a single inertia element or weight is used as described in connection with Figs. 19, 20 and 21, it will be sensitive to a given definite force. The heavier the weight, the more sensitive it will be to light forces and the more quickly it will complete the electrical contacts. A lighter weight is less sensitive and a greater force must be impressed before it functions. In this relative comparison, it is assumed that the sustaining springs are substantially equal in order to make this comparison since their relative forces would inject a further variable in the sensitivity of the mechanism. The electrical connections for the elements in Fig. 22 would each be as indicated in Fig. 21 for one element, thus making two parallel circuits in place of one. A resistance similar to 411 in Fig. 20 is placed in the current supply circuit feeding screws 402' and 417' since same are touched by discs 405' and 416' under light impulses. Current without passing through a resistance is led to screws 402 and 417 (corresponding to screws 402 and 417 in Fig. 21) which are touched by discs 405 and 416 under severe impulses. Instead of separate wires running from screws 418' and 418 to solenoid 420 of Fig. 21, these screws can be connected together with a single wire which runs thereto. Similarly screws 403' and 403 are connected electrically and a single wire runs to solenoid 432. The principle described is a different embodiment of the idea presented in Fig. 20 where current of varying intensity causes varying shock absorber needle control.

In view of ride-control of the shock absorbers being a feature of standard equipment, it is nevertheless possible to incorporate the automatic shock absorber control previously described in connection with Figs. 15, 16 and 17, and the automatic front and rear brake proportioning therewith. In Fig. 23 the casing 93 contains the proportioning slide 92 and the ports 77—a and 78—a are provided as previously described. Slide 92 is actuated by a responsive member within the housing 450. On the dash 452 is located the ride control lever 453. In the bell-crank form shown, it actuates the equalizer bar 455 through the connecting rod 456. A link 457 runs to lever 458 on cross shaft 351, which corresponds to the like cross shaft of Fig. 16. If handle 453 is depressed, rod 355 will be moved to the left or forward and rod 363 to the right or to the rear, which action stiffens the shock absorbers for ride-control. Such movement will occur when handle 453 is moved and if slide 92 is stationary. When slide 92 is actuated and moves to the left, it produces a like effect on rods 355 and 363, producing the results described in connection with Fig. 16. In this way the manual or automatic control can act independently of each other or, because of the equalizer bar 455, concurrently.

It is desirable to have the spring suspension afford increased resistance when a vehicle is rounding a curve in order to counteract the tendency of centrifugal force to compress the outside springs. This can be done by means of a shock absorber control, sensitive to centrifugal force and acting upon the shock absorbers on the side corresponding to direction of the force.

In Fig. 24 the ride-control rod 456 actuates the cross shaft 461 by means of lever 462. Cross shaft 461 is suitably mounted in the frame and the levers 464 and 465 actuate levers 466 and 467 by means of rods 468 and 469. Lever 466 is mounted on the half cross shaft 470 and lever 467 on the half cross shaft 471. A suitable bearing 472 keeps the shafts in alignment at the center. In Fig. 25 the lever 466 is shown in greater detail.

At the upper end it is provided with the spindle 474. A like spindle 475 forms part of lever 467. These spindles support the weights 478 and 479 on the ends of shanks 480 and 481. A spring 483 extends between the weights 478 and 479 holding them in the position shown against the stops 484 and 485. If we consider weight 478 in Fig. 24 and that the vehicle is turning in a circle upward to the left, centrifugal force on weight 478 will tend to make it move downwardly (in the drawings) but stop 484 will prevent its movement. If the vehicle swings in a path downwardly to the left, centrifugal force will cause weight 478 to move upward against the tension of spring 483 and cause the arm 488 to move in a counter-clockwise direction and actuating lever 489 through the intermediary of adjusting screw 490. The lever 489 is secured to the cross shaft 470 and the latter will be rotated by the centrifugal action on weight 478. The lever 492 on cross shaft 470 is provided with an upwardly and downwardly extending lever to actuate the shock absorber control rods on that side of the vehicle. It will therefore be seen that when centrifugal force throws the weight in the direction of side rail 1, the weight 478 will react and stiffen the shock absorbers on their compression side and thereby resist compression of the springs at the right side. At the same time no action occurs on the other side of the vehicle due to the inactivity of weight 479 through the stop 485. The finger 498, lever 499, set screw 500 and lever 502 perform the same function as that described in connection with the corresponding elements 488, 489, 490 and 492.

Another means of resisting centrifugal force and which would anticipate it, is by means of a shock absorber control interconnected with the steering mechanism which would produce resistance on the outside curve in the same manner previously described in connection with Fig. 24. To this end, the steering gear 510 in Figs. 26 and 27 is provided with the steering arm 511 and is provided at the lower end with the customary steering ball 512 which actuates the front axle steering mechanism (not shown). The brake proportioning slide 92 within casing 93 is actuated by a responsive element in casing 450 and actuates the cross shaft 515 by means of link 516 and lever 517. Passing through shaft 515 are the levers 520 and 521. At their upper arms they have the integral arms 522 and 523. The rods 524 and 525 connect their extremities with levers 526 and 527, each on the half cross shaft 528 and 529. At the extreme ends of the half shafts 528 and 529 are located the levers 530 and 531, having upwardly and downwardly extending arms to take the shock absorber control rods. Referring to Fig. 27, showing one of the levers 520, it will be noted that it passes through the shaft 515 and is positioned therein but free to rotate axially therein. At the lower end it is provided with the extension 534 which terminates in the ball 536. A similar extension 535 and ball end 537 is incorporated in lever 521. In the normal or neutral position a block 540 is interposed between the ball ends 536 and 537. The thickness of block 540 is equal to the space between the ball ends 536 and 537 when the extensions 522 and 523 are in axial alignment and at which time block 540 is in the neutral or central position. Rotation of shaft 515 under the influence of actuation by slide 92 will cause the levers 520 and 521 to rock with the shaft and the motion will be transmitted to the divided shafts 528 and 529 equally. There is sufficient surface at each side of block 540 so that the ball ends 536 and 537 will always be in contact with this surface during their travel under oscillation of shaft 515. Block 540 is mounted on the transverse shaft 541 which is supported at its inner end in a bearing 542. A spacer member 543 separates the extensions 534 and 536. Its purpose is to prevent clockwise rotation of lever 520 and counter-clockwise rotation of lever 521 over the position shown in Fig. 26. A spring or springs (not shown) are used to maintain balls 536 and 537 in contact with block 540 and at the same time maintain contact between extensions 534 and 535 and the spacer 543. Shaft 541 is moved transversely by the steering lever 511 through the connecting rod 545 and the bell-crank 546. Assuming that it is desired to turn the vehicle in a direction curving upward toward the left, the driver imparts a clockwise rotation to the steering wheel on steering gear 510 which results in a counter-clockwise rotation of arm 511 in Fig. 27. This direction of rotation is customary with the left hand steering gear location shown and with a drag-link running forward to the conventional front axle. Connecting rod 545 is moved rearwardly or to the right as a result, imparting a clockwise rotation to bell-crank 546 and an outward movement of shaft 541. In so doing, block 540 causes clockwise rotation of lever 521, resulting in a pull on rod 525 and an advancement of shaft 529, resulting in the stiffening of the shock absorbers on the steering gear side of the vehicle through lever 531. This side will be on the outside of the turn where the centrifugal force will tend to compress the springs. The rotation of shaft 529 increases the resistance of the shock absorbers on the side of frame rail 1 against compression of the chassis springs. As block 540 moves downwardly (in the drawings) to impart rotation to lever 521, lever 520 remains undisturbed due to the stop 543 and the shock absorbers on the other side of the vehicle are unaffected. Steering in the opposite direction results in increasing the resistance of the shock absorbers on the side of frame rail 2 and leaving the shock absorbers on the side of frame rail 1 unaffected. It will be seen that the actuation of the complete set of shock absorbers under the influence of slide 92 is independent of the modification of action due to steering. Either phase can work independently of the other or concurrently.

In the case of a vehicle having a three-point mounting, such as a centrally pivoted front axle or a substitute for same, stability of the vehicle when making a turn will be increased by the use of the system shown in Fig. 26. In a three-point vehicle, no stiffening effect is obtained by the pivoted front axle or its equivalent and the slight pitching tendency when making a turn creates a slightly unpleasant feeling. The system I proposed will overcome such, by controlling the shock absorbers which are used only at the rear of such a vehicle.

Figure 28:
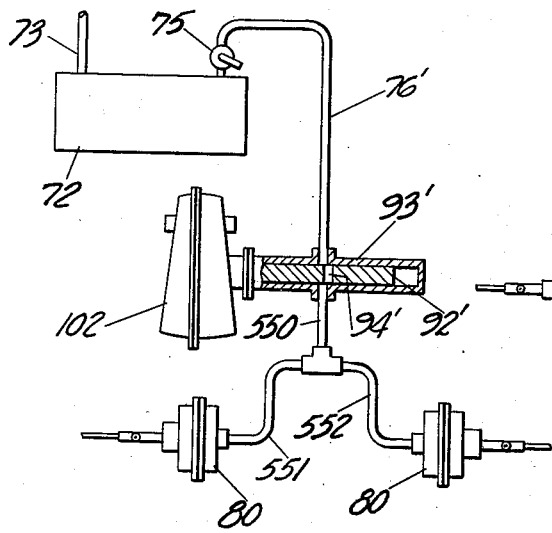
Figure 29:
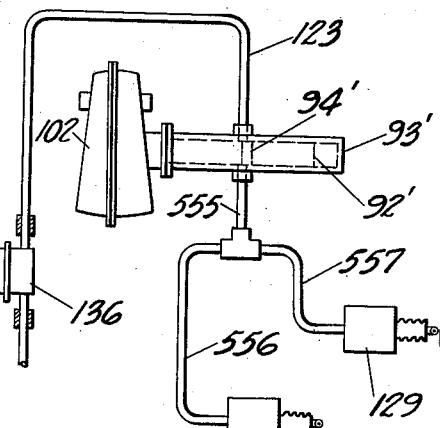

From the above it will be seen that various responsive means can be employed to distribute the braking effort between a multiplicity of braking units. It will be realized that the fundamental responsive means can also be utilized to control the intensity of effort of the braking system, unit or units. In other words, in referring to Fig. 4 the slide 92 can be provided with a single port 94 and placed in the air line 76, with the distribution of air to the diaphragm chambers 80 and 81 occurring after the air is passed through port 94. This is illustrated in Fig. 28 in which compressed air from reservoir 72 passes through the control valve 75 and air line 76' and enters the casing 93' within which is located slide 92'. The actuating mechanism 102 for slide 92' is of the pendulum type previously described. The axis of port 94' is located to the right of the axis of line 76' and the mating ports in housing 93'. The line 550 is branched into lines 551 and 552 which feed diaphragm chambers 80 and 81 respectively. In this instance, the position of slide 92' is such as to admit sufficient air when braking to stop the vehicle at relatively low speeds. When the severity of braking is greater such as at high speeds, the initial retardation of the vehicle will cause slide 92' to move to the left and port 94' is brought into more complete registry with the ports of lines 76' and 550. Similarly in Fig. 6 a single port 94 in slide 92 can be placed in vacuum line 123 and the branches to the booster cylinders 128 and 129 occurring after the port 94. The adaptation of the single port 94' is shown in Fig. 29 as applied to a vacuum system in which the feed line 123 conveys vacuum to the housing 93'. The axis of port 94' is again to the right of the axis of line 123 and line 555 which is branched into lines 556 and 557 before reaching the vacuum actuating cylinders 128 and 129. The same thing applies to the speed control shown in Fig. 10. In either case the maximum intensity of the braking units or system would be with the port 94 in full register with the corresponding ports in casing 93. Such a system is shown in Fig. 30 where the slide 92' is actuated by the centrifugal governor 240. The single port 94' is located as described in conjunction with Figs. 28 and 29. Acceleration, gravity, speed, loading, or other influences can react on slide 92 and reduce the braking effort of the whole system with a pre-determined fixed distribution below the maximum when the full effort is not necessary. In Fig. 31, the slide 92'' is normally located in casing 93' with the axis of the port 94'' in axial alignment with the lines 560 and 561. In this position the greatest effective area is presented through port 94''. In the event that slide 92'' is moved to the left, restriction will occur due to the reduction in effective projected area. The use of a diminishing projected area is illustrated in Fig. 32 where the apparatus described for Fig. 31 actuates the braking mechanism illustrated, consisting of brake cylinder 563 and the mechanism of rear brake 12 of the vehicle with side rail 1. Fluid pressure is conveyed to the braking system by line 565 which is branched to form lines 560 and 566, the latter connecting with brake cylinder 567 which actuates the mechanism in front brake 10. It will be seen that with a constant pressure in line 565, the pressure in cylinder 567 will increase as the pressure in cylinder 563 decreases due to movement of slide 92'' to the left. The diminishing braking effort of the rear brake is desirable at high speeds with the corresponding increase of effort at the front at slow speeds with slight retardation, and with low speeds there would be practically equal brake distribution between front and rear since there would be little or no movement of slide 92''.

While various mechanical fluid and electrical constructions have been shown, it will be realized that they can be interchanged insofar as the operating principle is concerned or other substitute means employed. Small movements can be magnified where desired and servo mechanisms utilized to amplify light or moderate impulses. There can be an interchange of mechanical equivalents. Thus a pendulum can be replaced by a sliding piston, sensitive to inertia, centrifugal, gravity or other forces in the same plane and the necessary ports provided therein and cooperating with mating ports in the surrounding cylinder, or establish electrical contact or contacts under movement of the piston. The results obtained would be similar to that derived by a pendulum impressing a force upon an actuated element.

It will be realized that the brake mechanism is automatically made sensitive to various forces heretofore not considered and that the braking system is interconnected with the suspension system in such a way that it will make the latter relatively free in action for normal riding and to resist the necessary loads imposed upon it during acceleration and under the effect of other disturbing forces that might affect normal vehicle stability.

What I claim as new is:

1. In a vehicle, a suspension system, brake mechanism, a braking system to impress a force on said brake mechanism, and means to modify the force impressed thereby and simultaneously modify the rigidity of said suspension system.

2. In a vehicle, a suspension system, brake mechanism, a braking system to impress a force on said brake mechanism, and means responsive to inertia forces to modify the rigidity of said suspension system and the forces impressed by said braking system.

3. In a vehicle, a suspension system, brake mechanism, a braking system to impress a force on said brake mechanism, means to modify the rigidity of said suspension system, means to manually actuate said modifying means, and automatic means to modify the force impressed by said braking system and actuate said means for modifying the rigidity of said suspension system.

4. In a vehicle, a suspension system, brake mechanism, a braking system to impress a force on said brake mechanism, and means responsive to centrifugal forces to modify the rigidity of the suspension system and the forces impressed by said braking system.

5. In a vehicle, a fluid pressure braking system including brake mechanisms associated with separate vehicle wheels and a single source of pressure fluid therefor; and means for supplying fluid from said source for brake operation, including a single control unit having means operable to simultaneously and differentially regulate the relative effective values of the fluid braking forces impressed upon the separate brake mechanisms.

6. In a vehicle, a fluid pressure braking system including brake mechanisms associated with separate vehicle wheels and a single source of pressure fluid therefor, pressure fluid supply connections between said source and the respective brake mechanisms, manually operable means controlling the supply of pressure fluid to said brake mechanisms, and means interposed in the supply connections between said manually operable means and the brake mechanisms, automatically responsive to changing conditions incident to vehicle operation, to govern the supply of pressure fluid and differentially regulate the relative effective values of the fluid pressure braking forces impressed upon the separate brake mechanisms.

7. In a vehicle, having front and rear brake mechanisms, a fluid pressure braking system to impress a braking force on each of said mechanisms, said system including a single source of pressure fluid, and control means for said system to variably proportion the distribution of fluid pressure braking forces between said front and rear braking mechanisms.

8. In a wheeled vehicle having a braking system and a chassis supported for movement relative to the vehicle wheels, means for variably regulating the effective braking pressure in the operation of said system, and means operatively responsive to actuation of said regulating means for proportionally limiting the permissible amplitude of movement of the vehicle chassis.

9. In a wheeled vehicle having a chassis supported for movement relative to the vehicle wheels, brake mechanism, means for variably regulating the braking force of said mechanism, and means operatively responsive to actuation of said regulating means to control and limit the permissible amplitude of movement of the vehicle chassis in proportionate ratio to the braking force.

10. In a wheeled vehicle having a chassis supported for movement relative to the vehicle wheels, brake mechanism, operating means therefor, and means, operatively responsive to actuation of said operating means, to control the permissible amplitude of movement of the vehicle chassis.

11. In a vehicle, a suspension system, brake mechanism, a braking system to impress a force on said brake mechanism, and means for proportionally varying the braking force on said brake mechanism and the rigidity of said suspension system.

12. In a vehicle, a suspension system, brake mechanism, a braking system to impress a force on said brake mechanism, control means for said braking system, and means responsive to an actuation of said control means to modify the rigidity of said suspension system.

13. In a vehicle, a braking system including front and rear brakes and manually controllable means for actuating said brakes from a common source of power; and means automatically responsive to changing conditions incident to vehicle operation, for governing the effective operation of said brake actuating means and differentially controlling the retarding influence of said front and rear brakes upon vehicle speed.

14. In a vehicle, a braking system including front and rear brakes and manually controllable means for actuating said brakes, and means responsive to and controlled by vehicle speed, at the moment of brake application, for governing the effective operation of said brake actuating means and differentially controlling the retarding influence of said front and rear brakes upon vehicle speed.

15. In a vehicle, a fluid pressure braking system, including front and rear pairs of brake mechanisms and a supply source of pressure fluid, means for proportionally controlling the supply of pressure fluid to said pairs of brake mechanisms, including a movable control element and inertia responsive means operatively connected to said control element.

16. In a vehicle, brake mechanism, manually operable means for supplying a braking force to said mechanism, a suspension unit including means for modifying the rigidity thereof, and means automatically responsive to changing conditions incident to vehicle operation, to regulate the effective value of the braking force supplied to said mechanism and simultaneously actuate said modifying means to control the reaction of said suspension unit in response to variable braking forces.

17. In a vehicle, brake mechanism, manually operable means for supplying a braking force to said mechanism, a suspension unit including means for modifying the rigidity thereof, a single control unit automatically responsive to changing conditions incident to vehicle operation, to regulate the effective value of the braking force supplied to said mechanism and simultaneously actuate said modifying means to control the reaction of said suspension unit in response to variable braking forces.

18. In a vehicle, front and rear brake mechanisms, manually operable means for supplying braking forces to said mechanisms, a suspension unit including means for modifying the rigidity thereof, and means automatically responsive to changing conditions incident to vehicle operation to differentially regulate the effective values of braking forces supplied to said front and rear brake mechanisms, and simultaneously actuate said modifying means to control the reaction of said suspension unit in response to variable braking forces.

19. In a vehicle, front and rear brake mechanisms, manually operable means for supplying braking forces to said mechanisms, a suspension unit including means for modifying the rigidity thereof, and a single control unit, automatically responsive to changing conditions incident to vehicle operation, to differentially regulate the effective values of braking forces supplied to said front and rear brake mechanisms and simultaneously actuate said modifying means to control the reaction of said suspension unit in response to variable braking forces.

20. The method of minimizing the resultant effects of inertia incident to brake application on motor driven vehicles, which consists in variably regulating the retarding effect of brake application in accordance with different driving speeds and simultaneously modifying the rigidity of the vehicle suspension system, in proportionate ratio.

21. The method of minimizing the resultant effect of inertia incident to brake application on motor driven vehicles, which consists in increasing the rigidity of the vehicle suspension system at the moment of brake application in proportion to the magnitude of speed retardation at various driving speeds.

22. The method of minimizing the resultant effects of inertia incident to brake application on motor driven vehicles, having front and rear wheel brakes, which consists in variably augmenting the braking torque reaction on the front wheels with respect to the rear wheels, in predetermined ratio to driving speed and independently of volitional brake control by the operator, and correspondingly increasing the rigidity of the vehicle suspension system at the moment of brake application, in direct proportion to the augmented braking torque reaction on the front vehicle wheels, at various driving speeds.

23. The method of minimizing the resultant effects of inertia incident to brake application on motor driven vehicles having front and rear wheel brakes, which consists in variably augmenting the braking torque reaction on the front wheels and simultaneously maintaining a braking torque reaction on the rear wheels, in predetermined ratio to driving speed and independently of volitional brake control by the operator, and progressively increasing the rigidity of the vehicle suspension system during brake application, in direct proportion to the augmented braking torque reaction on the front vehicle wheels, at various driving speeds.

24. In a vehicle, supporting means at the rear, supporting means at the front, braking means associated with each supporting means, mechanism to apply the front and rear braking means in a predetermined ratio, and means, automatically operable in response to the deceleration produced by the action of said braking means, to supplement the total braking force by adding to the force applied to the braking means associated with the front supporting means.

25. The invention defined by claim 24, said mechanism, including movable fluid pressure columns.

26. In a vehicle, supporting means at the rear, supporting means at the front, braking means associated with each supporting means, mechanism to apply the front and rear braking means in predetermined ratio, and control means for said mechanism including a member operable in response to the deceleration produced by the action of said braking means, to supplement the total braking force by adding to the force applied to the braking means associated with the front supporting means.

27. In a vehicle, supporting means at the rear, supporting means at the front, braking means associated with each supporting means, mechanism to apply the front and rear braking means in predetermined ratio, and inertia operable means automatically responsive to the deceleration produced by the action of said braking means, to control the operation of said mechanism and supplement the total braking force by adding to the force applied to the braking means associated with the front supporting means.

28. In a vehicle, supporting means at the rear, supporting means at the front, braking means associated with each supporting means, fluid pressure actuated mechanism to apply the front and rear braking means in predetermined ratio, a fluid pressure regulating device, and inertia operable control means for said device, responsive to the deceleration produced by the action of said braking means, to supplement the total braking force by adding to the force applied to the braking means associated with the front supporting means.

29. In a vehicle, supporting means at the rear, supporting means at the front, braking means associated with each supporting means, fluid pressure actuated mechanism to apply the front and rear braking means in predetermined ratio, a common fluid pressure control valve for the front and rear braking means, and means connected with said valve and operable in response to the deceleration produced by the action of said braking means, to actuate the valve and supplement the total braking force by adding to the force applied to the braking means associated with the front supporting means.

30. A brake system for vehicles having front and rear brakes comprising fluid controlled means for jointly applying said brakes in a predetermined ratio, movable means in fluid contact with and subject to the pressures of the fluid medium acting on said front and rear brakes and adapted to be moved in response to vehicle deceleration to modify said braking ratio.

31. A brake system for vehicles having front and rear brakes comprising fluid controlled means for jointly applying said brakes with pressures equal for both rear brakes and front brakes, movable means engaged by the fluid medium for operating said front brakes and also by the fluid medium operating the rear brakes, and inertia responsive mechanism operatively connected to said movable means whereby said movable means may move and change the ratio of braking between the front brakes and rear brakes.

32. In brake mechanism for vehicles having front and rear brakes, means to apply said brakes with equal forces through the instrumentality of movable columns of fluid medium, a conduit connecting said columns, a member movable in said conduit to change the ratio of forces applied by said columns, said movable member being movable in response to vehicle deceleration.

33. In a fluid brake system for vehicles having a chassis frame and front and rear wheels, brakes for said wheels, fluid pressure means to apply the rear wheel brakes, fluid pressure means to apply the front wheel brakes, a conduit connecting said fluid pressure means, movable means in said conduit and inertia responsive means operatively connected to said movable means whereby the latter may be moved to supplement the pressure on the front brakes under the influence of deceleration.

34. In brake mechanism for vehicles having fluid column means for applying front brakes and fluid column means for applying rear brakes, a conduit connecting said columns, a member movable in said conduit, said movable member adapted to move in response to vehicle deceleration whereby the ratio of front and rear brakes may be changed.

AUSTIN M. WOLF.